Sept. 5, 1950     E. I. BUTLER ET AL     2,521,149
TIRE HANDLING DEVICE
Filed Nov. 5, 1947     4 Sheets-Sheet 1
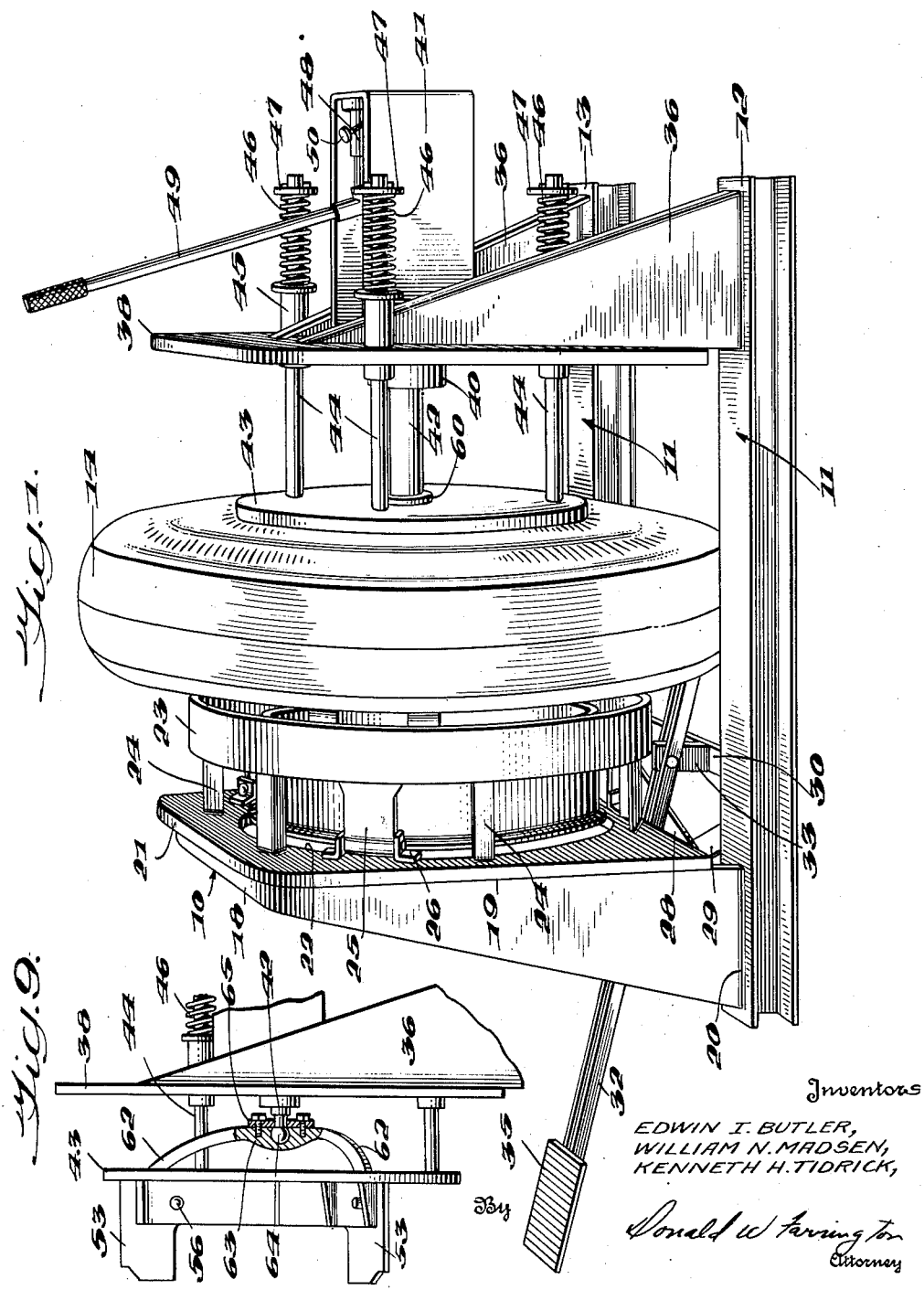
Inventors
EDWIN I. BUTLER,
WILLIAM N. MADSEN,
KENNETH H. TIDRICK,
By Donald W. Farrington
Attorney

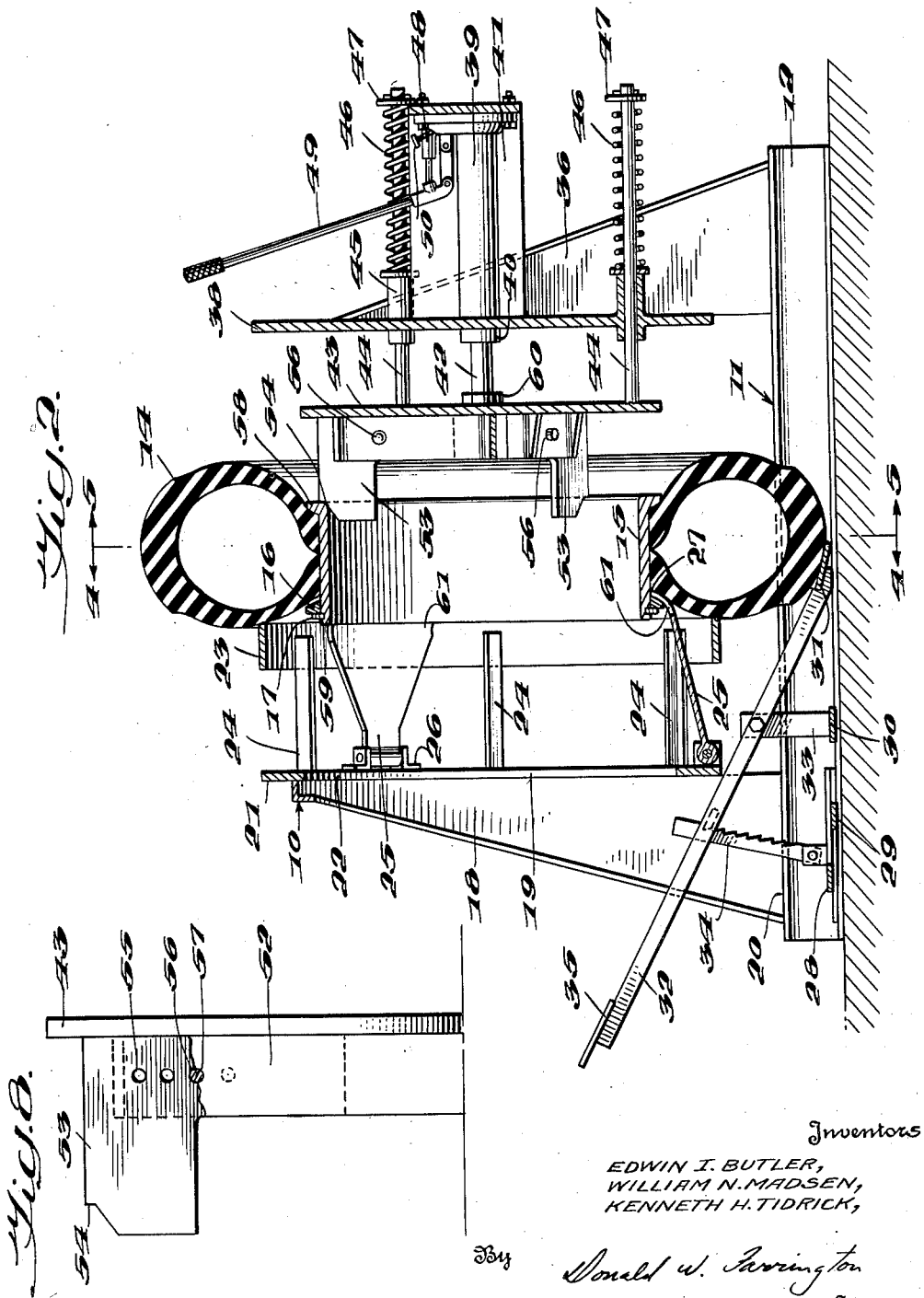

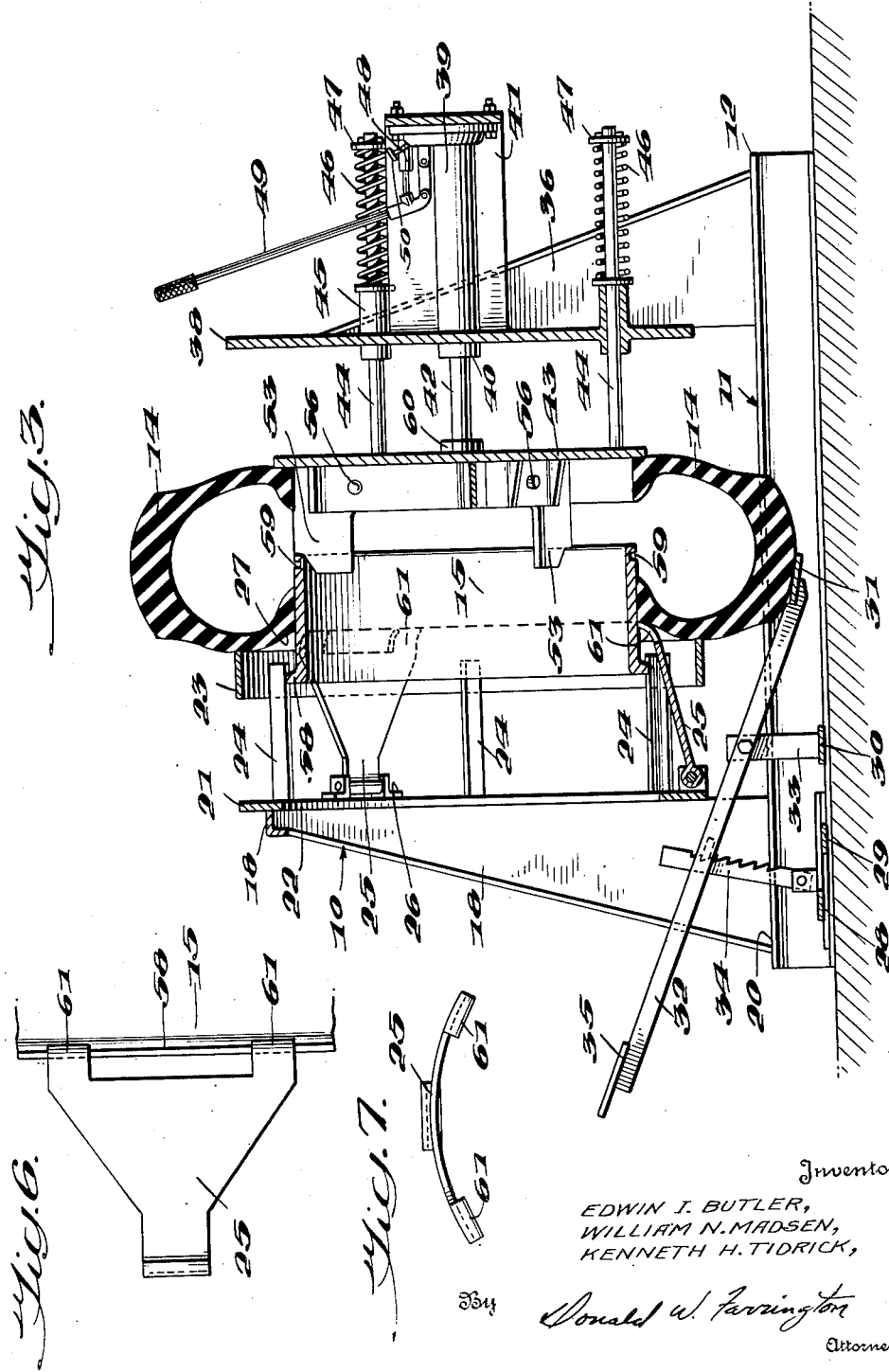

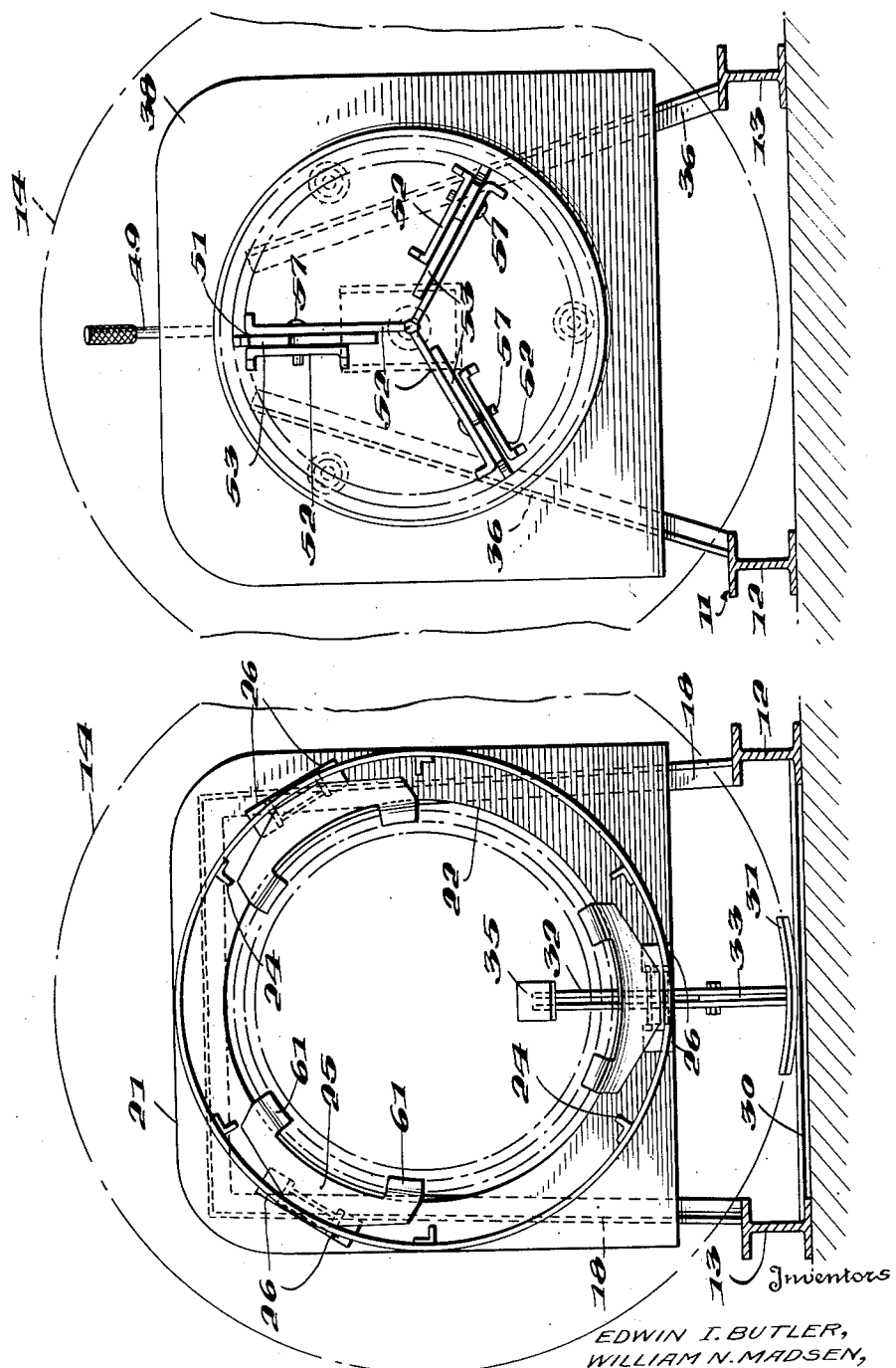

Patented Sept. 5, 1950

2,521,149

UNITED STATES PATENT OFFICE 2,521,149

TIRE HANDLING DEVICE

Edwin I. Butler, Charlotte, N. C., William N. Madsen, Essex, and Kenneth H. Tidrick, Brooklyn Park, Md., assignors to The Glenn L. Martin Company, Middle River, Md., a corporation of Maryland Application November 5, 1947, Serial No. 784,170

8 Claims. (Cl. 157—1.2)

Our invention relates to a tire handling machine and more particularly a device adapted to mount or remove a tire by the application of pressure at uniformly positioned points around a tire rim with the rim assembly enclosed and the tire held in its normal upright position.

In the mounting and demounting of tires, especially the type of heavy duty truck and aircraft tire mount that uses a rim having a loose flange held in place by a locking ring, the application of considerable force between the rim and tire is required to allow for working of the assembly. Prior to this invention, it has been necessary in removing a tire from such a rim to stretch and flex the bead and side walls of the tire progressively with hand tools or a rotating device, due to the tight fit built into such parts as well as their tendency to develop corrosive adhesion during service. Reversal of this operation is then necessary in mounting the tire on its rim in which case the tire is usually stamped and hammered into place and the tire side walls flexed progressively to allow the insertion of the locking ring adjacent the flange. The mounting is then completed by admission of air under pressure which forces the tire beads outwardly against the rim flanges. In case the locking ring should not be sufficiently inserted to lock the assembly, a violent disrupture of the assemblage is likely to occur. Such an operation is highly dangerous, not only as to the possibility of mechanical injury to the assembly, but also physical injuries to the workers, as none of the prior art tools afford any protection in case the assemblage should blow apart upon admission of air. Also, the lifting and progressively working of the tires, as is necessary with the prior art tools, not only involves danger of physical injuries to the workers, but is also slow and costly.

The present invention provides a machine adapted to insert or remove a tire rim by the application of sufficient hydraulic pressure at uniformly spaced points around the periphery of the rim with the rim parts structurally enclosed within the machine, and with the tire held in its normal upright position.

It is among the objects of our invention to provide a machine for mounting and dismounting a tire and rim assembly by means of hydraulic pressure exerted axially of the rim with the sidewall and bead areas of the tire held against movement in the same direction.

Another object is to provide an inexpensive, rugged tire handling device capable of working the tire rim into or out of a tire by hydraulic pressure applied axially of the tire positioned upright and bearing on its tread.

Still another object is to provide a device for quickly and safely assembling or disassembling a tire and rim.

Other objects of this invention will become apparent from the following description when taken in conjunction with the drawings in which like numerals refer to like parts in different views.

In the drawings:

Figure 1 is a perspective view of the tire handling machine of this invention.

Figure 2 is a cross section of the tire machine showing a tire and rim assembly in the mounting position.

Figure 3 is a sectional view showing a tire and rim in the demounting position.

Figure 4 is a cross section on line 4—4 of Figure 2.

Figure 5 is a cross section on line 5—5 of Figure 2.

Figure 6 is an enlarged plan view of the forked dog.

Figure 7 is an enlarged front view of the forked dog showing the arrangement of the tire contact points.

Figure 8 is a detail view of the thrust plate mount with one side of the channel partially cut away to show adjusting holes.

Figure 9 is a fragmentary elevation in partial section of a modified arrangement of the pressure mount.

Referring in detail to the drawings, Figure 1 illustrates the machine 10 of this invention as having a suitable base frame 11 comprised of two H beams 12 and 13 joined together by cross bars 28 and 29 and a channel member 30, suitably welded together. The size and location of the base members is such as to provide sufficient rigidity and strength to the machine while at the same time allowing for portability so that the device can be moved from place to place as the necessity arises. Also, it is obvious that the structure can be mounted flush with the floor if desired, although we have found that in this construction any of the conventional size tires can be conveniently rolled directly onto the base so as to position the tire 14 in its normal, upright position resting on its tread between the two beams as shown. This is a highly desirable feature, as in the handling of tires, especially of the heavy truck and aircraft type, lifting often requires additional man power or the use of expensive lifting equipment. By the arrangement of our device, wherein the tire working parts are adapted to move in a horizontal plane, the tire 14 with its rim 15, loose flange 16, and locking ring 17 forming the tire assembly, can be readily rolled into and out of working position by the operator unassisted.

The action of the machine 10 is to smoothly and swiftly press the rim 15 into the desired position under hydraulic pressure applied at points uniformly positioned around the periphery of the rim with the tire backed up against and held from undesired movement by oppositely positioned holding means. The compressive force exerted on the rim is centered about the axial center line of the tire assembly between uprights positioned and supported by the base. Thrust force exerted against the tire is provided for by a U-shaped brace 18 mounted across the base 11 with the legs attached to the tops of the H beams as at 20 by welding, or a like attaching means, with the straight edge 19 portion facing toward the opposite end of the base. Attached to the straight edge 19 is a back plate 21 having an apertured center 22 centered axially above the base members 13 and 14. Spaced inwardly by posts 24 mounted on the inner face of the back plate 21 is a guard ring 23 positioned to encircle aperture 22. The length of and the positioning of posts 24 are such as to provide a sufficiently large working area between the ring 23 and the back plate 21 as to allow for access to the tire assembly to position the flange 16 and locking ring 17 of the rim assembly. The breadth and diameter of ring 23 is not critical, but need only be of sufficient strength and size to provide a fixed abutment capable of making engagement with the sidewall area of the largest size tire to be handled when placed in working position, as well as provide protection against injury should the parts accidentally blow apart on admission of air under pressure.

Uniformly positioned around the axial center line of machine 10 and dependently mounted from the back plate 21 are a plurality of forked dogs 25 forming adjustable abutments arranged so that the ends 61 (Figs. 2, 3 and 4) of each dog extend inwardly to engage and bear against the bead area 27 of tire 14. Each of the dogs 25 are mounted with the end opposite from the fork points 61 pivoted in mounts 26 carried by plate 21 adapted for swinging adjustment as required to engage the beads of different size tires. In this manner, the bead area 27 of tire 14 is abutted through dogs 25 to the back plate 21.

Positioning of the tire 14 vertically, in order to provide for the centering of tires of different sizes and those having worn treads, is accomplished by means of an adjustable lift platform 31 spaced between the beams 12 and 13 of the base and mounted on the end of an adjusting arm 32 pivoted at point 33 carried by the channel member 30. Retention of the adjustable positioning of the platform 31 is attained by a ratchet 34, or like means, carried by the cross bars 28 and 29 and positioned for ratchet engagement with arm 32. Arm 32 is provided with a foot pad 35 mounted on its free end for the convenient manipulation of the lift by the operator.

An abutment for the pressure end of the machine is provided by two uprights 36 weld attached to the tops of the H beams 12 and 13. Secured to and supported by the uprights 36 is a front plate 38 arranged with its inner face spaced parallel from the back plate 21. The front plate 38 is apertured to receive the head 40 of a hydraulic ram 39 of conventional design having its base secured to a bracket 41 attached to plate 38. The plunger 42 of the ram 39 is centered relative to ring 23 to deliver force at the axial center line of a tire 14 positioned in the machine. A thrust plate 43 of substantially the same diameter as the largest rim to be handled by the machine is carried by the forward end of plunger 42 and attached thereto with a suitable collar 60 welded to the thrust plate. Additional support for the thrust plate 43 is provided by a plurality of slide rods 44, radially positioned relative to the plunger 42, having ends attached to the thrust plate 43 and mid sections slidably mounted in sleeves 45 inserted through apertures formed in the front plate 38. Rods 44 are provided with encircling coil springs 46 held under spring tension by removable abutments 47 on the ends of rods 44 opposite the thrust plate 43. Liquid pressure to ram 39 is provided for by hand pump 48 having an actuating handle 49 conveniently located for manipulation by the operator. Such manipulation effects hydraulic movement of the ram to force thrust plate 43 toward the back plate 21 against the urge of springs 46. Release of pressure allowing for retraction of the ram 39 and plate 43 by springs 46 is provided for by a release valve in the fluid line having a hand screw 50 positioned at the base of the pump.

The opposite face of the thrust plate 43 from the ram plunger is provided with a plurality of radially extending grooves 51 (best illustrated in Fig. 5) formed by strips of metal 52 spaced apart and weld attached to the plate. Spacing of the strips 52 is of such widths as to provide for slidable securing of thrust arms 53 mounted for engagement of notched ends 54 with rim 15 (Figures 2 and 3) of the tire assembly. Radial adjustment of the thrust arms 53, to provide for engagement with the rims of different size tires, is provided for by a plurality of adjusting holes 55 formed in the thrust plate as shown in Figure 8. Each of the thrust plates 53 are held in predetermined positions by pins 57 adapted for insertion through aligned apertures 56 formed in the strips 52 and adjusting holes 55 formed in the thrust plates. The spacings of the adjusting holes 55 are such as to allow for positioning of each of the thrust plates 53 so that their notched ends 54 are properly adjusted to engage the edge of a rim 15 formed to receive a certain standard size tire. Is this manner, adjustment of the thrust plates 53 can be quickly made to handle any of the standard size tire and rim assemblies of the type shown.

When mounting a tire 14 on rim 15 as shown in Figure 2, sufficient force is applied to the fixed flanged edge 58 of the rim 15 with the opposite side wall of the tire bearing against ring 23 and the bead 27 held against movement with the rim by the dogs 25 to flex the tire 14 and allow for protrusion of the opposite edge of the rim beyond the bead. This permits positioning of the loose flange 16 around the rim 15 against the adjacent bead. With the tire held in this flexed condition with the flange 16 positioned adjacent the tire bead, the locking ring 17 is ready of insertion in notch 59 of the rim 15. The pressure on the ram 39 can be then released sufficiently to allow the tire to assume its normal position with opposite beads bearing against opposite flanges 16 and 58 of the rim 15. The tire in this condition is then ready for inflation with the loose flange side of the assembly still encircled by the ring 23 which acts as a guard in case the locking ring 17 should fail to function properly.

In Figure 3, the tire assembly is shown in proper position for demounting a tire 14 from its rim 15 in which case the rim is forced inwardly of the tire, the loose flange and locking ring having been previously removed. In this operation the thrust plates 53 are first positioned to the size tire to be worked so that their notched ends 54 engage with the edge of the rim 15, and on extension of the ram plunger 42 hydraulic pressure is exerted uniformly around the rim to force it toward the back plate 21 with the tire bead 27 held against axial movement by dogs 25 swung into engagement therewith.

Operation of our machine is as follows:

In the mounting of a tire 14 on its rim 15, as shown in Figure 2, the locking ring 17 and loose flange 16 are first inserted within ring 23 of the machine with dogs 25 swung outwardly of these parts. The inner tube (not shown) is inserted in the tire 14 and the rim 15 is inserted within the beads as far as it can be pushed in by hand after which the tire and rim are rolled onto the base 11 of the machine 10 with the tread resting on plate 31. The tire is then raised by foot pressure applied to pad 35 of the lifting arm 32 sufficiently to bring the rim 15 into alignment with the thrust arms 53 and increased fluid pressure to the hydraulic ram 39 is attained by the operation of pump 48 by handle 49 to force the thrust plate 43 toward rim 15 so that the notched ends 54 of the thrust arms 53 engage the flanged edge 58 of the rim at equally spaced points around its periphery. Dogs 25 are swung inwardly to engage the bead 27 of the tire 14 at spaced points around its periphery so as to hold it against axial movement with the rim 15. Further positioning of the rim within the beads is obtained by increasing the fluid pressure in the ram 39 by further pumping. In this manner, sufficient pressure is readily obtained to force the rim 15 into the position as shown in Figure 2 wherein sufficient rim area is exposed beyond bead 27 to permit the insertion of the loose flange 16 around the rim inwardly of the locking groove 59. The locking ring 17 is then inserted in its groove 59. The thrust plate 43 carrying thrust arms 53 is then backed-off sufficiently to allow the tire 14 to assume its natural unflexed condition with the beads in their normal positions bearing against opposite beads of the rim by releasing sufficient liquid pressure from the ram through the release valve to allow its retraction under the urge of springs 46 encircling guide rods 44. The tire and rim assembly is then in condition for inflation of the tire. Inflation of the tire is highly desirable while resting in the machine due to the fact that the ring 23 and posts 24 provide a working shield of sufficient strength to protect the operator against injury in case the locking ring should become accidentally dislodged from its groove 59 allowing the tire assembly to blow apart.

In the demounting of a tire 14 from its rim 15, as shown in Figure 3, practically the same operation is performed in reverse. The tire is deflated and rolled onto the machine with the fixed flange 58 inwardly of the machine away from the thrust plate 43. The dogs 25 are adjusted against the bead 27 after which pressure is brought against the rim to force it out of the tire by movement of the thrust arms 53 of the thrust plate 43, as previously explained, to force the rim inwardly of the tire. In those cases where the tire bead 27 is stuck to the non-fixed flange 16 and locking ring 17, the parts can be readily loosened by first forcing the bead back from the flange in a manner similar to that of the mounting operation. In either manner of working the tire, ample hydraulic force can be exerted on the rim 15 to press it into or out of contact with the beads of the tire as a complete pressing operation wherein the force is exerted uniformly around the rim without danger of injury to the rim or tire.

In Figure 9 is shown a modification in the ram plunger 42 connection with the thrust plate 43. The plunger 42 is provided with a ball 64 centered in a socket mounting 63 carried by radial spiders 62 arranged to provide pivoted thrust force at points radially spaced from the axial center line of the machine. This arrangement of the thrust conveying parts is particularly suited for use on a tire where equal distribution of force at the outer periphery of the tire rim is desired, even though the tire and rim assembly may be misaligned relative to the plunger 42.

While we have described our invention in detail in its preferred embodiment, it will be obvious to those skilled in the art after understanding our invention that various changes, alterations, modifications and substitutions can be made therein without departing from the spirit and scope of the appended claims.

We claim as our invention:

1. Apparatus for removing a tire from a rim comprising spaced rigid abutments, a cylindrical ring spaced inwardly of one abutment and having an inner diameter exceeding the outer diameter of the rim and rim flange, arranged to bear against the side wall of a tire disposed between said abutments, a plurality of circumferentially spaced members supporting said ring from said one abutment, a plurality of dogs carried by said one abutment and adapted to extend through the open center of said ring member into engagement with said tire adjacent the rim, means carried by the other abutment mounted for movement with respect thereto toward said one abutment, and members carried by said means, constructed and arranged to engage said rim and having an outer diameter corresponding to the inner diameter of the tire, whereby movement of said members effects axial movement of the rim toward said one abutment and disposition of said members within the tire.

2. A rim and tire handling device comprising a pair of spaced, vertically disposed, fixed abutments, a ring supported from one abutment in spaced relationship thereto and having an inner diameter exceeding the outer diameter of the rim and rim flange so as to engage the side wall of a tire disposed between the abutments, axially movable means carried by the other abutment, including members proportioned with respect to the rim and tire to engage the rim only at that side of the rim opposite the ring, and pivoted members on the said one abutment, to engage the tire bead and prevent axial movement thereof with the rim.

3. A device for mounting and demounting the tire of a tire and rim assembly comprising a base, a pair of spaced upright supports carried by said base, tire engaging means carried by one of said supports, rim engaging means carried by the other support, one of said engaging means being mounted for generally horizontal reciprocation toward and away from the opposite support, said one engaging means, when retracted, being spaced axially from the other engaging means an amount more than the axial width of the tire and rim assembly, and means carried by the associated support for forcibly moving the movable engaging means toward the opposite support.

4. A device for mounting and demounting the tire of a tire and rim assembly comprising a base, a pair of spaced upright supports carried by said base, tire engaging means carried by one of said supports, rim engaging means carried by the other support, one of said engaging means being mounted for generally horizontal reciprocation toward and away from the opposite support, said one engaging means, when retracted, being spaced axially from the other engaging means an amount more than the axial width of the tire and rim assembly, an adjustable platform carried by said base and arranged between said supports to raise a tire and rim assembly rolled thereon in a generally vertical position into alignment between said engaging means, and means carried by the associated support for forcibly moving the movable engaging means toward the opposite support.

5. A device for mounting and demounting a tire of a tire and rim assembly comprising a base, a pair of spaced supports carried adjacent opposite ends of said base and extending upwardly therefrom, a cylindrical ring member spaced inwardly from one of said supports and of such a diameter that its inner edge is adapted to engage one side wall of a tire radially outwardly of the bead area thereof, a plurality of circumferentially spaced members supporting said ring from said one support, a plurality of tire bead engaging dogs pivotally carried by said one support and of such length as to extend generally inwardly slightly beyond the tire engaging edge of said ring member, a rim engaging head member movably carried by the other support, coaxially with said ring member, for reciprocation toward and away from said first support, said head member when retracted, being spaced axially from said ring member an amount more than the axial width of said tire and rim assembly, means carried by the base for lifting a tire and rim assembly into a generally vertical position between said head and said ring with said assembly axially aligned therewith, and power means for forcibly moving said head member toward said first support.

6. A device for mounting and demounting a tire of a tire and rim assembly comprising a base, a pair of spaced supports carried adjacent opposite ends of said base and extending upwardly therefrom, a cylindrical ring member spaced inwardly from one of said supports and of such a diameter that its inner edge is adapted to engage one side wall of a tire radially outwardly of the bead area thereof, a plurality of circumferentially spaced members supporting said ring from said one support, a plurality of tire bead engaging dogs pivotally carried by said one support and extending through the central opening of said ring to a point slightly beyond the tire engaging edge of said ring member, a rim engaging head member movably carried by the other support member for reciprocation toward and away from said first support, said head member when retracted, being spaced axially from said ring member an amount more than the axial width of said tire and rim assembly, means carried by the base for lifting a tire and rim assembly into a generally vertical position between said head and said ring with said assembly axially aligned therewith, and power means for forcibly moving said head member toward said first support.

7. In a device for mounting and demounting a tire and rim assembly, a base, an upright support carried by said base, a cylindrical ring member spaced horizontally from said support with its axis substantially horizontal, said ring being of such a diameter that its edge is adapted to engage one side wall of a tire radially outwardly of the bead area thereof, a plurality of circumferentially spaced members supporting said ring member from said support, a plurality of tire bead engaging dogs pivotally carried by said support and extending from said support, through the central opening of said ring member, to a point slightly beyond the tire engaging edge of said ring member, a rim engaging head movably supported from the base coaxially with said ring member for reciprocation toward and away from said support, and power means for forcibly moving said head member toward said support.

8. In a device for mounting and demounting the tire of a tire and rim assembly, a base, a pair of spaced upright supports carried by said base, tire engaging means carried by one of said supports and adapted to engage the side wall of a tire located between said supports, a rim engaging head member movably carried by the other support and arranged for reciprocation toward and away from said one support, said head member, when retracted, being spaced axially from said tire engaging means an amount greater than the axial width of said tire and rim assembly, an adjustable platform arranged between said supports for lifting a tire and rim assembly into a vertical position wherein it is axially aligned between said tire engaging means and said head member, and means for forcibly moving said head member toward said one support.

EDWIN I. BUTLER.
WILLIAM N. MADSEN.
KENNETH H. TIDRICK.

REFERENCES CITED

The following references are of record in the file of this patent:

UNITED STATES PATENTS

| Number | Name | Date |
|---|---|---|
| 585,696 | Player | July 6, 1897 |
| 1,564,496 | Staugaard | Dec. 8, 1925 |
| 1,724,813 | Weaver et al. | Aug. 13, 1929 |
| 2,375,956 | Smith et al. | May 15, 1945 |
| 2,406,996 | Colley | Sept. 3, 1946 |
| 2,418,849 | Polt | Apr. 15, 1947 |
| 2,423,652 | Kelley | July 8, 1947 |
| 2,449,289 | Garey | Sept. 14, 1948 |